(12) United States Patent
Lee (10) Patent No.: US 7,802,694 B2
(45) Date of Patent: Sep. 28, 2010

(54) PRESSURE VESSEL DOOR SEAL MECHANISM

(75) Inventor: Olaf N. Lee, Centerville, MN (US)

(73) Assignee: Alliance Technology Group, Inc., Roseville, MN (US)

( * ) Notice: Subject to any disclaimer, the term of this patent is extended or adjusted under 35 U.S.C. 154(b) by 366 days.

(21) Appl. No.: 11/663,483

(22) PCT Filed: Sep. 21, 2004

(86) PCT No.: PCT/US2004/031007

§ 371 (c)(1),
(2), (4) Date: Jan. 7, 2008

(87) PCT Pub. No.: WO2006/041439

PCT Pub. Date: Apr. 20, 2006

(65) Prior Publication Data

US 2008/0257888 A1     Oct. 23, 2008

(51) Int. Cl.
B65D 45/32    (2006.01)
B65D 45/16    (2006.01)
F17C 1/00     (2006.01)
F17C 13/06    (2006.01)

(52) U.S. Cl. .................. 220/582; 220/319; 220/581; 220/324; 220/320

(58) Field of Classification Search ............ 220/582, 220/581, 324, 320, 319
See application file for complete search history.

(56) References Cited

U.S. PATENT DOCUMENTS

| | | | |
|---|---|---|---|
| 66,758 A | 6/1867 | Webster | |
| 1,269,572 A | 6/1918 | Allenbaugh | |
| 1,748,491 A | 2/1930 | May | |
| 2,010,200 A | 8/1935 | Rufener et al. | |
| 2,196,895 A | 4/1940 | Bowman | |
| 2,268,507 A * | 12/1941 | Gertzon | 165/158 |
| 2,518,143 A | 8/1950 | Huszar | |
| 2,584,500 A * | 2/1952 | Riordan | 49/246 |
| 2,601,936 A * | 7/1952 | Harris | 220/298 |
| 2,662,663 A | 12/1953 | Schmidt et al. | |

(Continued)

FOREIGN PATENT DOCUMENTS

| | | |
|---|---|---|
| DE | 3421 907 C1 | 6/1985 |
| DE | 200 08 919 U1 | 10/2000 |
| GB | 2 342 137 A | 4/2000 |
| WO | 95/13148 | 5/1995 |
| WO | 00/72987 A1 | 12/2000 |

OTHER PUBLICATIONS

The American Society of Mechanical Engineers "Rules for Construction of Pressure Vessels" Jul. 1, 2003.

*Primary Examiner*—Ehud Gartenberg
*Assistant Examiner*—Kareen Rush
(74) *Attorney, Agent, or Firm*—Pauly, DeVries Smith & Deffner, L.L.C.

(57) ABSTRACT

The invention relates to a pressure apparatus that can be used to process solid waste materials into useful, fuel and recyclable streams. The pressure vessel utilizes, conditions of heat and pressure to process the solid waste into the fuel and recyclable streams reducing hazardous materials and offensive odors. The vessel comprises an elongated container having enclosed volume and at least one open end. The open end is sealed using a closure having a closing apparatus. The closing apparatus is a rapidly actuated easily used mechanism that maintains the door in a sealed closed position maintaining useful pressure but can be readily opened with little effort for either removing processed waste or for introducing unprocessed solid waste.

5 Claims, 4 Drawing Sheets

U.S. PATENT DOCUMENTS

| | | | | |
|---|---|---|---|---|
| 2,664,611 | A | 1/1954 | Shomber | |
| 2,989,209 | A | 6/1961 | Hersman | |
| 3,107,810 | A * | 10/1963 | King | 220/316 |
| 3,258,151 | A | 6/1966 | Gasche | |
| 3,269,587 | A * | 8/1966 | Svenson | 220/582 |
| 3,386,612 | A * | 6/1968 | Kirkwood et al. | 220/231 |
| 3,746,205 | A * | 7/1973 | Helguera | 220/573.4 |
| 3,838,825 | A * | 10/1974 | Haas et al. | 241/175 |
| 4,102,474 | A * | 7/1978 | Platts | 220/323 |
| 4,114,933 | A * | 9/1978 | Jankelewitz et al. | 292/37 |
| 4,115,695 | A * | 9/1978 | Kelman | 378/17 |
| 4,157,146 | A * | 6/1979 | Svenson | 220/324 |
| 4,175,669 | A * | 11/1979 | Housholder et al. | 220/4.12 |
| 4,178,232 | A * | 12/1979 | Nollet | 209/3 |
| 4,192,519 | A | 3/1980 | Buggele | |
| 4,247,015 | A | 1/1981 | Straub | |
| 4,312,279 | A | 1/1982 | Wilson et al. | |
| 4,315,577 | A * | 2/1982 | Bernson, Jr. | 220/323 |
| 4,342,207 | A | 8/1982 | Holmes et al. | |
| 4,388,873 | A * | 6/1983 | Carleton et al. | 105/377.11 |
| 4,489,850 | A * | 12/1984 | Reneau | 220/323 |
| 4,555,041 | A * | 11/1985 | Muehl | 220/203.2 |
| 4,570,816 | A * | 2/1986 | Ferris et al. | 220/314 |
| 4,622,860 | A | 11/1986 | Cametti et al. | |
| 4,809,873 | A * | 3/1989 | Fossey | 220/324 |
| 4,881,862 | A | 11/1989 | Dick | |
| 4,974,781 | A | 12/1990 | Placzek | |
| 5,134,944 | A | 8/1992 | Keller et al. | |
| 5,142,830 | A | 9/1992 | Carpenter | |
| 5,201,259 | A | 4/1993 | Covert et al. | |
| 5,361,994 | A | 11/1994 | Holloway | |
| 5,388,535 | A * | 2/1995 | Eshleman | 110/255 |
| 5,437,387 | A * | 8/1995 | Burns | 220/326 |
| 5,438,935 | A * | 8/1995 | Seitz | 105/377.11 |
| 5,445,329 | A * | 8/1995 | Anderson | 241/65 |
| 5,447,017 | A | 9/1995 | Becher et al. | |
| 5,540,391 | A * | 7/1996 | Anderson | 241/17 |
| 5,587,320 | A | 12/1996 | Shindo et al. | |
| 5,625,655 | A * | 4/1997 | McDonald et al. | 376/203 |
| 5,655,718 | A * | 8/1997 | Anderson | 241/17 |
| 5,666,878 | A | 9/1997 | Taricco | |
| 5,678,722 | A * | 10/1997 | Reneau | 220/323 |
| 5,711,450 | A * | 1/1998 | Reneau | 220/319 |
| 5,885,529 | A * | 3/1999 | Babson et al. | 422/65 |
| 6,053,348 | A * | 4/2000 | Morch | 220/263 |
| 6,095,365 | A * | 8/2000 | Yielding | 220/264 |
| 6,230,921 | B1 * | 5/2001 | Berglund | 220/319 |
| 6,267,069 | B1 * | 7/2001 | Keehan | 114/74 A |
| 6,306,248 | B1 * | 10/2001 | Eley | 162/4 |
| 6,328,234 | B1 * | 12/2001 | Saucier et al. | 241/1 |
| 6,332,909 | B1 | 12/2001 | Teshima et al. | |
| 6,397,492 | B1 | 6/2002 | Malley | |
| 6,458,240 | B1 * | 10/2002 | Bouchette et al. | 162/4 |
| 6,568,685 | B2 * | 5/2003 | Milano et al. | 277/358 |
| 6,588,690 | B1 | 7/2003 | Koenig | 241/65 |
| 6,648,932 | B1 * | 11/2003 | Maton | 48/119 |
| 6,692,544 | B1 | 2/2004 | Grillenzoni | 44/589 |
| 6,752,337 | B2 * | 6/2004 | Koenig | 241/23 |
| 6,752,956 | B1 * | 6/2004 | Vanderwal | 422/3 |
| 6,789,578 | B2 * | 9/2004 | Latham et al. | 138/89 |
| 6,929,144 | B2 * | 8/2005 | Yi | 220/318 |
| 7,036,674 | B2 * | 5/2006 | McGuire | 220/263 |
| 7,070,053 | B1 * | 7/2006 | Abrams et al. | 206/459.5 |
| 7,472,721 | B2 * | 1/2009 | White et al. | 138/89 |
| 7,497,392 | B2 * | 3/2009 | Lee et al. | 241/21 |
| 7,503,987 | B2 * | 3/2009 | Kawakami et al. | 149/19.7 |

* cited by examiner

PRESSURE VESSEL DOOR SEAL MECHANISM

This application is being filed as a PCT International application in the name of Alliance Technology Group, Inc., a U.S. corporation, on 21 Sep. 2004.

FIELD OF THE INVENTION

The invention relates to a pressure vessel used to recycle solid waste and produce a usable fuel with recycle streams. The pressure in the vessel is maintained by a door that maintains effective pressure, temperature and humidity within the vessel. The effects of mechanical action, heat, pressure and humidity can be used to break down cellulosic waste into a fuel. The vessel also produces an easily separable glass, metal and plastic recycle stream, depending on solid waste content.

BACKGROUND OF THE INVENTION

The disposal of solid waste materials has become a major problem for both public and private organizations. Recycling programs have successfully used only a portion of this waste stream, however. The vast majority of waste streams are either burned or introduced into landfills.

Throughout the built environment, the amount of solid waste generated by individual households, businesses and governmental units has substantially increased over the last ten years. Disposal of such waste materials has become an increasingly difficult problem for both private and public organizations. The convenience and cost of waste disposal has steadily increased along with the environmental impact of the solid waste on land use, portable water and the atmosphere of the natural environment.

Recycling efforts have had some success; however, the major proportion of recyclable materials is not recycled and remains as solid waste. In order to obtain valuable materials, solid waste materials have been treated or pretreated. None of these pretreatment processes has been widely accepted in view of the relatively high cost and low efficiency of solid waste separation processes. One attempt to introduce apparatus Systems and processes for treating waste material to form a useful fuel and a glass, a metal or other recyclable streams is found in Anderson, U.S. Pat. Nos. 5,445,329, 5,540,391, 5,655,718 and the related PCT WO 95/13148 and also in Garrison et al., PCT WO 00/72987. These references disclose apparatus, methods and processing of municipal solid wastes into fuel and recyclable streams such as a glass stream, a metal stream and a plastic stream if implemented.

These processes involve an apparatus that can be used to treat solid waste material. The waste material is placed into a vessel, contacted with steam and processed at increased temperature and pressure. The variety in moisture, temperature and pressure within the vessel contacting the solid waste under conditions of rotary agitation can cause the solid waste product to break down into a useful burnable solid fuel and can also result in formation of easily separable metal, glass and plastic streams that can be readily removed from the solid fuel material using conventional separation techniques based on magnets, density and particle size-type separating systems such as a trommel or flat bed separator.

The vessel used to treat the solid waste requires the application of pressure to successfully treat the solid waste efficiently. The pressure, up to 600 psig (about 4200 kPa), about 60 psig (about 410 kPa) or as little as 10 psig (about 100 kPa), can be maintained within the vessel between charging and discharging the vessel using a closure system. The prior art apparatus and processes, while adequately treating the solid waste for the purpose of obtaining fuel and separable recyclable stream, have their productivity reduced by the difficulty in attaching the closure after charging and then removing the closure from the vessel for the purpose of discharging the treated waste. A variety of prior art pressure vessel closure systems have been disclosed. Representative patents include King, U.S. Pat. No. 3,107,810, that shows a rotatable tab system that can be used to seal a high pressure autoclave. FIG. 1 of King shows door 14 and lugs 18 and 19. These lugs 18 and 19 are slanted in order to cause the door to seal against the frame. Hersman, U.S. Pat. No. 2,989,209, discloses a unique flexible polygonal gasket that under pressure forms a seal in the structure. See FIGS. 4 and 5 of Hersman and the movable polygonal gasket structure. Bowman, U.S. Pat. No. 2,196,895, shows a segmented structure driven by a mechanical screw mechanism. FIG. 3 of Bowman shows the ring in a retracted position, while FIG. 2 of Bowman shows the ring in an expanded position. Bowman uses a non-continuous segmented closure structure that uses a bolt-like threaded member to advance and retract each segment to affect the seal. The screw causes the diameter of the circular member to increase or decrease in diameter to effectuate the seal. Platts, U.S. Pat. No. 4,102,474, shows an expandable door lock/closure mechanism. As shown in FIG. 1 of Platts, the structure includes a number of blocks 8 that can be moved from a locking position to an unlocked position or from an unlocked position to a lock position forming a "nearly complete ring" to seal the door. Multiple blocks 8 are moved by hydraulic cylinders 50 and place the blocks into locking position. Reneau, U.S. Pat. No. 4,489,850, also shows a segmented seal structure that can be moved radially to seal the door. The door seals shown in FIG. 1 of Reneau at 16a through 16f are moved by locking pawls P that push the member into a locking position. This mechanism is somewhat similar to the mechanism in Bowman, however, it uses a relatively complex pawl driven movement system made unnecessary by the simple structure of the present invention. Other patent references include, Placzek, U.S. Pat. No. 4,974,781, which shows a discharge door 60, as aspects of a pressure vessel. Anderson, U.S. Pat. Nos. 5,445,329, 5,540,391 and 5,655,718, shows vessel supports 64 and docking ring 180 in FIGS. 6, 16 and 19. Koenig, U.S. Pat. Nos. 6,588,690 and 6,752,337 show a discharge closure for a pressure vessel in FIGS. 1 and 10 and vessel closure 70-72.

In light of the technology disclosed above, a substantial need exists for a pressure vessel closure system having desired properties, while at the same time being configured for ease of use. The pressure vessel closure system should be capable of maintaining a pressure vessel at an internal pressure up to about 30 psi, 206,850 Pa (206.85 kPa) or 60 psi (417.70 kPa), at an increased internal temperature up to at least about 140° C., additionally at a substantial relative humidity, i.e., up to about 100% relative humidity, while being readily moved or removed for discharge and replaced after introduction of solid waste for treatment. The rate at which the closure can be opened and closed can substantially increase productivity, reduce costs and improve the overall quality of the solid waste or recycled streams.

BRIEF DISCUSSION OF THE INVENTION

We have found a pressure vessel closure system for use with a pressure vessel that is easily opened and closed during operation., the vessel can be operated at pressures between about 15 inches of mercury (about 50.8 kPa) and about 206,850 Pa (206.85 kPa), at a temperature between about ambient and 140° C. to 200° C. and at a relative humidity between about ambient and up to 100% relative humidity. We have also developed processes using the pressure vessel and closure system. The time and temperature of the process is adapted to maintain thermoplastic materials intact and not to cause the melt coating of the internal surfaces of the vessel with a plastic coating.

The door closure system of the invention involves a closure that can be moved quickly and easily from an open position to a closed position. The door closure system can be easily removed, if desired. In the closed position, a circular member, split locking ring or movable ring member at the vessel opening can be moved radially from an open unlocked position to a closed and locked position by changing the vessel diameter of the split ring or split circular member. The split ring or circular member can be moved using means that can change the diameter of the circular locking member, moving the locking member from the closed locked to an open and unlocked position. The enlarged diameter can be either the locked or unlocked position. In other words, the locked position can comprise either the larger of the diameters with the unlocked position being the smaller of the locking member diameters. Alternatively, the locking position can be the smaller of the locking member diameters, while the unlocked position is the larger diameter, depending on design. If the locking member is positioned proximate the door perimeter, then the unlocked position of the circular member is the smaller diameter. As the diameter is increased, the circular member extends past the periphery of the door into the vessel channel, spanning the interface between the door channel and the vessel channel, locking the door in position. Alternatively, if the circular member is placed in the vessel opening, the locking position is the position of a smaller diameter. In this second embodiment, the circular member spans the interface between the closure and the vessel, locking the closure in place. The circular member can be mounted as a part of the door assembly or as a part of the vessel assembly.

DETAILED DISCUSSION OF THE INVENTION

The invention involves an apparatus that can be used to treat waste materials of many different types including municipal waste, industrial waste, military and governmental waste streams. Such waste streams can arise from municipal waste collection from businesses and residential locations. Such waste can include both inorganic and organic components in the form of cellulosic materials, metals, plastic, glass, food waste and others. Such wastes can be derived from packaging materials that can be mixed cellulosic paperboard packaging materials, corrugated paperboard, plastic wrap, plastic bottles, steel cans, aluminum cans, and other plastic or metal packaging materials and glass bottle and container waste. Such waste can be any combination of plastic, metal and paper, etc. Material typically available in municipal waste that can be used either as a feedstock for fuel production or as a valuable recycle product include cellulosic fiber or pulp, paperboard, corrugated paperboard, newsprint, glossy magazine stock and a variety of other cellulosic board or sheet materials, which can include polymers, fillers, dyes, pigments, inks, coatings and a variety of other materials. Plastics common in recycle streams include polyolefins such as polyethylene, polypropylene, polyesters such as polyethylene terephthalate, polyvinyl chloride, mixed stream plastics and other thermoplastic materials. Metal streams can include ferromagnetic metals such as iron, steel, and magnetic alloys, non-ferromagnetic metals such as aluminum and other such materials in the form of cans, foils, sheet materials, etc. Glass materials can be clear or colored green or brown.

Once treated by the apparatus and process disclosed herein, the waste streams can produce a valuable fuel and separable metal, plastic and glass streams that can be sorted, segregated and stored, based on various physical parameters of the waste stream material. For example, the ferromagnetic metals can be separated by magnetic properties; other products can be separated by density or other known parameter.

In the process of the invention, many contaminating components of such waste streams can be removed by the action of heat and humidity. In other words, the solid waste stream can be cleaned of contaminants, thus improving the quality and value of the recycled products. Food waste is a common contaminant, as are volatile materials; these are quickly removed. Some materials with substantial heating value, such as inks, coatings, oils, lubricant and natural greases, and others can remain in the waste stream to the fuel. Other less valuable materials are removed by solubilization using heat, humidity, mechanical process, and energy. Such contaminants can be removed from the waste stream increasing the value of the product. As a result, a clean value enhanced stream of cellulosic material, glass material, metal material and plastic material can be derived from other process equipment.

The process implemented within the vessel of the invention uses the effects of heat, pressure and humidity within a rotating vessel to receive and process the solid waste material. The vessel is configured to have various positions. The vessel can be in a raised, charging position during introduction of material into the vessel. The vessel can then be operated either in the raised or a horizontal position to treat the waste. When the process is ended, the vessel can be lowered to a lowered, discharge angle to remove the treated contents of the vessel and to move the contents to further processing stations.

Within the vessel, at appropriate conditions of temperature, pressure and humidity, and the rotating mechanical action of the vessel, in combination with the internal structure of the vessel, import shear forces and change in temperature and change in pressure forces on the internal structure of the waste. Such agitation and changing conditions within the vessel causes the solid waste within the vessel to expand and force fibrous materials to break fiber-to-fiber bonding, thus resulting in the production of substantially increased fibrous character in the particular cellulosic waste stream. The change in pressure and change in temperature causes substantial changes in the nature of water within the fibrous material. The change of water from a liquid to a steam characteristic material improves the quality of the fibrous material resulting in a fiber that can be recycled to provide a pulp, fiber or high quality fuel.

The waste stream is treated through the effects of heat, humidity and pressure within a longitudinal vessel that can rotate along an axis. The vessel has an opening at an end of the vessel and a support and rotational drive means at the opposite end of the vessel. The opening in the vessel permits the waste stream to be introduced into the interior of the vessel through a door that can be readily moved from a closed position to an open position. The door is mounted on the vessel with a hinge structure and a closure system that can be rapidly implemented to either close and lock the door for processing purposes or unlock and open the door quickly for charging the waste or discharging the treated waste.

Important aspects of the vessel involve means for introducing steam at various pressure and temperature characteristics into the interior of the vessel to heat and impart moisture or humidity to the waste material within the vessel for treatment purposes. The vessel additionally includes an enclosed heated stream of fluid positioned appropriately within the interior of the vessel to introduce heat. The heat within the vessel is transferred from the mobile fluid into a treatment zone of the vessel. The fluid flow follows a path, typically in conduit that permits the heating of the interior of the vessel throughout the important treatment zone. The heated fluid is separated from the waste within the treatment vessel by the conduit, keeping the mobile fluid free of contamination and in a form that can act to successfully transmit heat into the interior of the structure.

The vessel includes means to rotate the vessel along a longitudinal axis. To rotate the vessel, one end of the vessel is supported by a motor driven rotation means that can include a belt, chain, gear driven rotation means or other motor driven apparatus that can impart a rotation to the vessel of about −8 to about 8 revolutions per minute (rpm). The vessel of the invention, at the opposite end from the rotational means, is mounted in a frame and is supported on a bearing that permits the vessel to rotate within the frame at the desired rotational speed. In light of the vessel rotation, the fluid transfer conduits are preferably configured such that the heating fluid can pass into the rotation vessel through means to transport the fluid from a stationary conduit to a rotating zone.

The invention involves a process and system that can treat a waste stream through the use of high temperature, high pressure steam that includes one, two or more vessels interconnected and also connected to common steam sources and common heated fluid sources. Such ganged vessels in sets of two, three, four or more can use or reuse steam, heat and moisture by passing the materials from vessel to vessel during operation. In such a process, waste material with a first vessel can be treated with steam in the interior of such a vessel. This steam can be directed into the interior of a second or subsequent vessel. As such, moisture and temperature, pressure and humidity can be shared and cycled through the ganged vessels improving efficiency and output of the process by increasing productivity for the recycle stream and the fuel stream.

Within each individual vessel, the process typically includes steps such as introducing a solid waste stream into the treatment interior of the vessel, raising the temperature of the interior-processing zone of the first vessel simultaneously with the introduction of steam into the vessel. In other vessels in the ganged treatment zone, the steam from the first vessel can be transferred to subsequent vessels to utilize the pressure, temperature and water content of the steam for further processing aspects.

Within the vessel, the waste treatment is maintained in a treatment environment. In such a treatment environment, the treatment process can involve the increase of heat, pressure and humidity within the vessel as the vessel rotates along a longitudinal axis. The moisture content of the waste material increases as the temperature and pressure increases. The cellulosic material, in particular, can absorb substantial quantities of water and as the pressure vessel is rotated, the cellulosic material can reach a uniform water content that is maximized in order to obtain fiber cellulosic cell breakdown resulting in an improved fibrous recycle stream. Once the cellulosic material reaches a substantial equilibrium of water content, then the temperature and pressure within the vessel is vented from the vessel, preferably to a second or third vessel in the treatment area, also reducing the moisture content of the waste material to a predetermined level by heating the treatment material with the heated fluid. The change in pressure and temperature in conjunction with the heat from the mobile heating fluid causes moisture within the cellulosic material to change in state from a liquid to a gaseous or vapor state resulting in combination and disruption of the cellulosic fiber and cell structure, improving the quality of the resulting separated fiber materials.

Within the treatment vessel, during processing, waste material is saturated with moisture using steam and increased temperature and pressure. The waste material is tumbled using the rotational aspect of the treatment vessel. Because of the changes in temperature, pressure and moisture content, the physical characteristic of the material changes during processing. Particularly, the cellulosic materials having a cell structure and fibrous character results in disrupted cells and expanded fiber and separated fiber structure. Particle size of the cellulosic material is reduced.

An additional feature of the process and as a result of the processing characteristics, the waste material including the cellulosic material is cleaned of many of the food soils and volatile organic components. The metal, glass and plastic components of the recycle stream are similarly cleaned. These cleaning and disruption characteristics of the process result in a uniform product. The resulting fiber or pulp can be recycled for paper making or used a high quality fuel. The product uniformity is obtained by obtaining a relatively consistent set of process parameters within and throughout the vessel. Accordingly, due to the steam introduction, heat flow and rotation of the materials, the temperature, pressure and moisture content of the material tends to be substantially uniform resulting in a uniform treatment of the waste stream.

As stated above, the process of the invention can involve at least two vessels but can be used with three, four or more vessels. The municipal solid waste used within the system is typically obtained from businesses, residences, the military, governmental and other common waste stream generating locations. During the process, waste material is introduced into the vessel. Surfactant materials can act as a wetting agent increasing the degree of contact between the particular cellulosic waste material portion of the waste material and the subsequent addition of steam or water content. The moisture content of the waste material is adjusted to a desired level through the introduction of steam. The steam increases temperature and pressure within the vessel initiating the treatment process. The heated liquid conveyed throughout the interior of the vessel increases the temperature at a relatively uniform rate to achieve a desired level of temperature and pressure within the interior of the vessel. During the vessel operation, the vessel is rotated and the vessel is maintained at an appropriate temperature and pressure, or the temperature and pressure are changed as needed, to comminute or modify the cellulosic materials and to discharge the products. The rotation breaks down and modifies the cellulosic cells and fiber, facilitates removal of food soil and organic contaminants from the glass, plastic and metal objects, and improves uniformity of treatment within the vessel. At an appropriate time, the vessel is vented to begin cooling and depressurization of the vessel, while at the same time, removing moisture in the form of steam or humidity from the interior of the vessel. The heated liquid within the vessel structure heats the contents of the vessel in order to remove water from the processed stream, resulting in a reduced moisture or substantially dried material with a moisture content that ranges from about 30 to about 50 wt % in the cellulosic component. Once sufficiently dried to be efficiently removed from the vessel and used as a fuel or recycle source, the vessel is opened, positioned appropriately and emptied of the treated waste. The vessel is then placed in the appropriate position for subsequent solid waste introduction and the vessel cycle can be restarted. The steam and pressure vented from the vessel in a previous step can be recycled in a subsequent vessel.

Before loading, the vessel is typically positioned at an angle above the horizontal of approximately 35-50 degrees but can be placed at 90° (on end) if needed. The vessel door, if not open, can be opened and a loading device, typically a conveyor, can introduce a quantity of the solid waste into the interior of the vessel. If the material is to be pretreated with surfactants or water, such additives can be introduced into the waste material at this point, such as with conventional spray equipment, resulting in a uniform pretreatment.

Vessels typically have an internal volume of about 1200 to about 3000 cubic feet (about 30 to 90 m$^3$) and can typically contain about 12 to about 36 tons (about 11 to 32.7 metric tons) of solid waste for efficient treatment. During charging of the vessel with solid waste, the vessel can be maintained stationary or can be rotated to distribute the waste or initiate the treatment process resulting in a uniform mass of waste material prior to the introduction of heat and humidity. The interior of the vessel contains the fluid conduits and other veins or fins in order to improve agitation and introduction of mechanical forces on to the solid waste within the vessel. The rotation of the vessel mechanically agitates the solid waste within the vessel and begins to change the nature of the solid waste.

One added advantage of the mechanical action relates to the change in the nature of the cellulosic component of the solid waste. The treated cellulosic materials are more easily separable from the glass, plastic and metal components of the solid waste than prior to treatment. The introduction of temperature, pressure and humidity into the solid waste causes the cellulosic components of the solid waste to absorb water, and lose tensile strength and modulus rapidly. The water tends to plasticize the fibers causing the fibers to more easily move one against the other and causing the cell structures of the cellulosic materials to swell and expand due to moisture absorption. The material undergoes substantial mechanical forces in the interior of the vessel, due to the mass of the solid waste, which itself causes mechanical action within the waste, and due to the interior of the vessel structure both, together these create mechanical impact forces and shear forces on the structure of the solid waste substantially changing the solid waste characteristics. The mechanical impact and shear force reduce the material such that cellulosic material, regardless of its source, such as wax containing multi-level corrugated paperboard or laser printer paper, rapidly loses strength and is comminuted into smaller cellulosic structures having separated fibers, disrupted cell structure and reduced volume and increased density. After the material is charged into the vessel, but prior to treatment, the initial condition of the solid waste is about 25-50 wt % moisture at ambient temperature and pressure.

Once the solid waste is held appropriately within the vessel, the door is closed and locked. In the vessel of the invention, the diameter of the locking ring is changed such that the locking ring interacts with a portion of both the door and the vessel seal holding the door in place with sufficient mechanical integrity to maintain pressure within the vessel that can range from about 15 inches of mercury (about 50.8 kPa) to about 30 pounds per square inch (about 207 kPa) within the vessel. As discussed above, the split ring or locking member can move from a position of a first diameter 50 cm to 5 m to a reduced diameter, placing it into locking position. Alternatively, the split ring or locking member can be changed from an initial diameter 50 cm to 5 m to an increased diameter, placing the split ring or locking member in a locked position.

Figure 3:
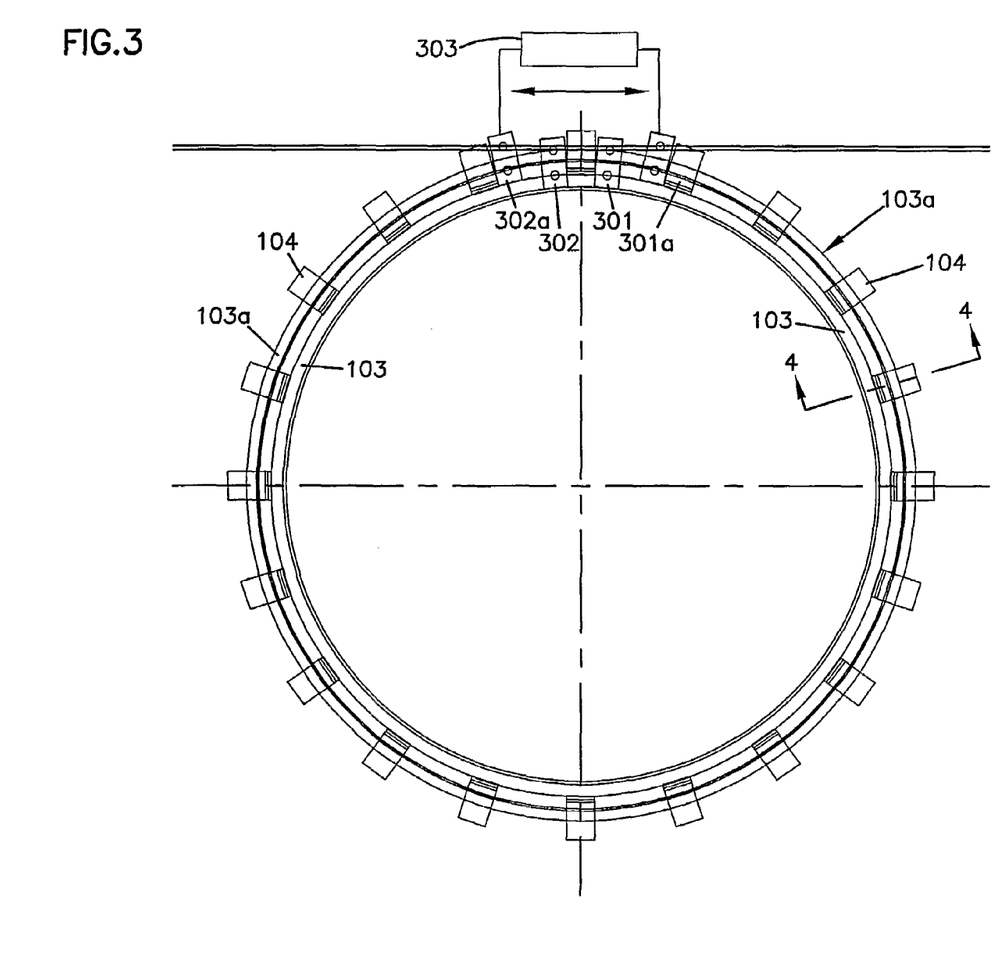
FIG. 3 is a plan view of the circular member, also known as the split ring, ring keeper or locking ring, showing the open position and the closed lock position of the locking ring as actuated by a mechanical actuator that can expand the distance between the split ring ends to cause change, such as an increase or decrease, in the diameter of the locking ring. The diameter of the locking ring changes, i.e., expands or contracts from an unlocked open position to a locked and closed position.

The locking diameter of the split ring or locking member can be changed using a mechanically or electrically driven screw drive, solenoid or hydraulic cylinder attached to the ends of the split ring as shown in FIG. 3. The split ring has a position wherein it is not under any strain, while in its other position; it is under substantial mechanical strain due to the impact of the mechanism causing change in the diameter. It is often useful to maintain the split ring or locking member under strain for a minimum amount of time. Accordingly, the split ring is maintained in its unstressed condition while locked in place. The split ring is often under substantial strain when it is placed in an unlocked diameter during opening and closing operations of the door. The diameter of the ring can often change about 10 to 12 inches (about 25 to 30.5 cm); for example, it can be changed from 80.5 to 92.5 inches (about 2.0 to 2.4 m) to either open the ring or close the ring. In one mode, the initial position can have a diameter of about 1.8 m to 2.2 m with a final position of 2 m to 2.5 m. In the alternate mode, the initial position can have a diameter of about 2 m to 2.5 m with a final position of 1.8 m to 2.2 m. The split ring is made of common steels such as 1040 and is rolled into its final split ring shape in order to maintain its resiliency.

Figure 1:
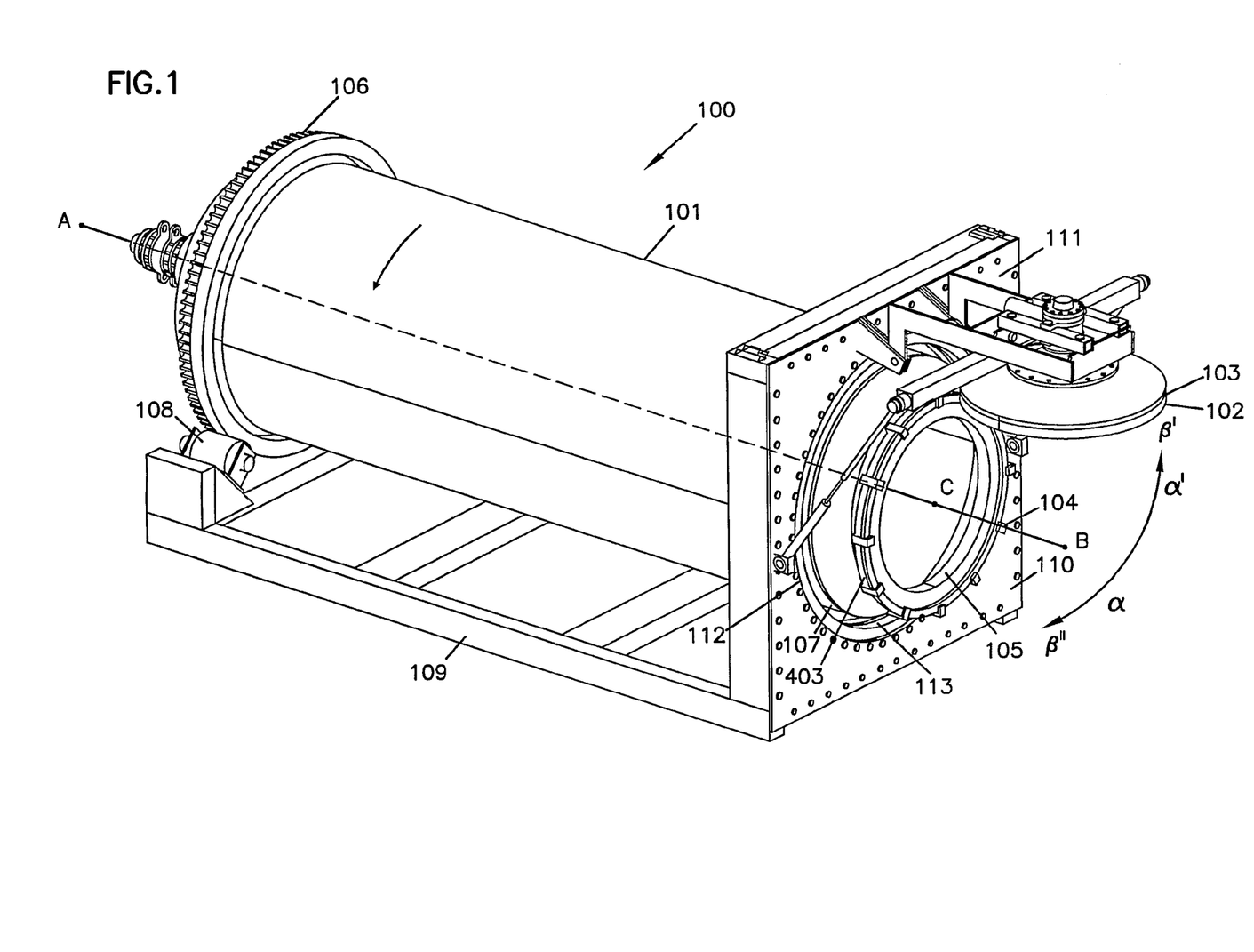
FIG. 1 is an isometric view of a pressure vessel of the invention showing the drive mechanism movable door and support frame. The vessel rotates on a gear driven support, which supports the vessel, bearing and rotation. The vessel is charged through the door.

The door is typically placed on the frame structure. The door is mounted on a movable or hinged structure such that the door can be placed in a convenient closed position and an open position and rapidly moved therebetween. When in an open position, as shown in FIG. 1, the angle at the hinge from the door structure to the line ACB passing through the center of the rotatable vessel is approximately 0 degrees; that is, the door is approximately parallel to line ACB. When closed, the angle between the door and hinge and line ACB is approximately 110 degrees. Typically, the hinge of the door structure is placed on the frame into which the bearing structure supporting the vessel is installed. The door is placed on the frame at a position above the vessel. The term "above the vessel" in this disclosure relates to the positioning of the vessel as it is moved from its charging to its discharging position. The door is preferably placed at a location such that it will not substantially interfere in the charging and discharging of the vessel. Clearly, placing the door in a position such that the discharge from the vessel would contact the door is undesirable. Further, in charging the vessel, having the door above the charging means increases the likelihood that charging of the solid waste into the vessel will go without problem and after the charging means are removed, the door can easily be closed and locked in place. The door is moved either mechanically or using hydraulic piston and hydraulic pressure to move the door between a locked or closed position and its open position. The door is configured to rotate with the pressure vessel.

Once the vessel door is closed, the vessel is degassed and pressure can be introduced into the vessel. During the primary degassing, the vessel is rotated at a speed of about −8 to about 8 rpm. During this step, an eductor or other equipment draws a vacuum on the vessel to around 15 inches of mercury (about 50.8 kPa) prior to steam being introduced into the vessel. Steam used after the degassing step can remain within the vessel as moisture for further processing. The degassing process uses the eductor for degassing or gas removal. While undergoing mechanical action and shearing action, the waste material is heated to a temperature of about 200-220° F. (about 93-104° C.), generally by using around 50 pounds per square inch (about 345 kPa) of steam from the other vessel(s) that is already charged. These operations initiate the conversion of cellulosic material into treated material and initiate the cleaning step. During the second phase, heated liquid from the mobile fluid heats the internal structure and waste material within the vessel. The vacuum drawn by the eductor on one vessel draws the steam pressure out to degas the interior of the other vessel while introducing steam and moisture into the first vessel. The end point of the degassing phase of the second vessel is detected when the pressure in the interior of the first vessel reaches or exceeds the pressure in the second vessel. At this point, the interior of the vessel is substantially filled with solid waste and moisture.

During the cooking phase, the speed of the rotation of the vessel can range from about −8 to about 8 rpm, while the direction of rotation can be alternated or maintained in a single direction to increase wetting mechanical action and shear. The angle of the vessel to the horizontal can also be adjusted to maximize wetting mechanical action and shear. Such an angle can range from approximately horizontal to as much as 20-25 degrees above or below horizontal. During the second phase, the moisture content of the material and the interior of the vessel is maintained at high proportions. The temperature and pressure within the vessel causes moisture from the steam to be absorbed by the cellulosic material aiding in the breakdown of the cellulosic material into useful fuel or fibrous end product. Within the vessel, the vessel is operated to obtain a relatively even distribution of the material within the vessel, substantial uniform moisture content within the cellulosic portion of the treated waste, and to obtain constant or uniform mechanical action and shear directed to the solid waste within the vessel. One important characteristic of this step is the removal of coatings, additives, inks, sizing and other materials from the paper material into the vessel. As such, coatings, inks, clay and other coating materials are removed from the cellulosic structure.

During this phase, the temperature within the vessel is typically about 250-280° F. (about 121-138° C.) at a pressure of about 30 psi (about 207 kPa). At this moisture content, the cellulosic materials in the waste material tend to be disrupted at a maximum rate. Such disruption, as discussed above, disrupts cell structure and causes fibrous cellulosic materials to separate one from the other.

Additionally, thermoplastic materials that have a melting point less than the internal temperature of the vessel begin to melt or deform into easily separable melt structures. High density polyolefin and polyester products are converted into a form that is readily removed from the solid waste stream by density and particle size. Thus, the waste can be treated to separate the cellulosic fibers from the high density and low-density plastics. The low-density plastics present in the waste material often form small beads or pellets of the low-density plastics. The low-density plastics can then be separated from the high-density polyester or polyolefin material.

The heating phase of the process can continue for a period of about 20 to about 40 minutes depending on the nature of the solid waste, the change in temperature and pressure of the materials inside and the experience with the vessel and local waste stream. During this phase, the glass of the waste can often be reduced in particle size to provide a glass stream that can easily be removed from the remaining waste. Metal particulates are often unchanged by this process. Cellulosic components of the waste, however, often change into a material that resembles cellulosic pulp or wood pulp, a precursor to the papermaking process. The pulp is often separated from polymer coating, clay, filler, ink or dye constituency of the recycle waste stream material. At the end of the heating phase, typically 20-40 minutes, the vessel is vented to the atmosphere and the interior of the vessel is heated to dry the interior components.

During the drying phase, the vessel is maintained at a rotational speed of about −8 to about 8 rpm. The release in pressure and removal of moisture from the cellulosic component of the waste material tends to increase the disruption of the cellular and fibrous structure of the cellulosic material when increasing its recyclability and value. Steam is vented during the drying phase through the eductor or to another vessel to cause temperature and pressure and moisture content of the vessel to be reduced. The material cools to a temperature of 150° F. (about 65° C.) and less with a moisture content of about 30-40%. The drying of the contents can be accelerated using the introduction of heat through the heated fluid phase. As the material dries, it tends to be more easily separated into recyclable cellulosic plastic, metal and glass streams. Moisture tends to agglomerate the waste, while increased dry condition of the material tends to increase the degree of separation.

After being dried to an acceptable moisture content, typically about 30 to about 40% water, the vessel is vented through the eductor to 0 psi (0 kpa) and the door is unlocked and rotated into an open position. The vessel is then positioned so that the door is below line ACB, the horizontal position, permitting ease of removal of the contents. The vessel is rotated at a rate of about −8 to about 8 rpm causing the mechanical components of the interior of the vessel to rotate and mechanically force the vessel contents to the lowered open end of the vessel. Once the angle and rotational speed of the vessel has emptied the vessel substantially, the vessel opening can then be raised for further charging of waste material and further processing.

DETAILED DISCUSSION OF THE DRAWINGS

FIG. 1 is an isometric view of the pressure vessel of the invention mounted using a frame and bearing member with a rotary gear driven mechanism. FIG. 1 shows the vessel door in an open position. Not shown in FIG. 1 is a mechanism that can cause the vessel door to be raised to a loading position and lowered to a discharge position. Such equipment is known in the art and can consist of a cantilevered hydraulically driven lift.

In FIG. 1 is a line ACB positioned at the axis of the rotation of the vessel. The direction of rotation of the vessel is shown by an arrow in FIG. 1, but the rotation can be in either direction at the choice of the operating personnel.

The line segment ACB has a point C that is proximate the opening of the vessel. As the vessel is tilted, the line ACB can be raised or lowered about point A such that the point B is raised to position β' through angle α' into a position at which the vessel can be charged with solid waste. After processing, the vessel is placed in a position such that point B is at position β" and is lowered by angle α to a discharge position, such that the treated solid waste can be discharged from the vessel. Conventional electric, hydraulic or mechanical means can be used to raise and lower the angle of the rotating vessel. As can be seen in the drawing, ease of movement and repetition of opening and closing of the door can be an important aspect of obtaining a quick and efficient charge of the solid waste into the vessel accompanied with a quick and efficient discharge of treated waste at the end of the processing.

FIG. 1 shows the overall vessel assembly 100, including pressure vessel 101, gear drive 106, 108 and support structure 110. The pressure vessel 101 is shown with its indicated direction of rotation. Pressure vessel 101 is supported at a drive end by a geared support system including and a drive motor 108 and gear drive 106. At the opposite support end of the vessel, is a support end comprising frame 109, plate 111 and bearing assembly 113. Support frame 109 and bearing assembly 113 support the thrust load of the pressure vessel and the axial or weight load of the pressure vessel in its various operating orientations. The assembly comprises plate 111, and installed in a circular aperture 112, is bearing assembly 113 that supports the vessel. When in its depressed mode for unloading, the thrust load of the pressure vessel against the support frame is substantial, while in its elevated mode for charging, the thrust load of the pressure vessel against the support frame is reduced. However, the axial or weight load of the pressure vessel on the support frame is relatively constant regardless of orientation.

The pressure vessel 101 rotates about line ACB at a rate of about −8 to 8 revolutions per minute in order to adequately treat the solid waste to form an easily separable fuel component from a recycle stream that comprises metal, plastic and glass which can be subsequently separated into separate glass, metal and plastic streams in downstream processing (not shown).

Vessel 101 includes an opening that provides access to the vessel interior. FIG. 1 further shows door 102 and door closure surface 105 that provide access to the vessel interior via the opening. As it closes, door 102 contacts door closure surface 105 to create a metal to metal seal. Door 102 further has a locking ring 103 (which can also be referred to as a split ring or a ring keeper) which can expand to lock door 102, or contract to unlock and open door 102. The vessel opening further comprises a vessel locking member 104 that interacts with locking ring 103 to lock door 102 in a closed position. Vessel locking member 104 is positioned with a recess having a position into which the locking keeper or locking ring 103 can expand and lock door 102 in place. Door 102 is shown in FIG. 1 in an open position, allowing access into the vessel. In a closed position, door 102 is placed such that it contacts door closure surface 105 in a closed and sealed position.

Figure 2:
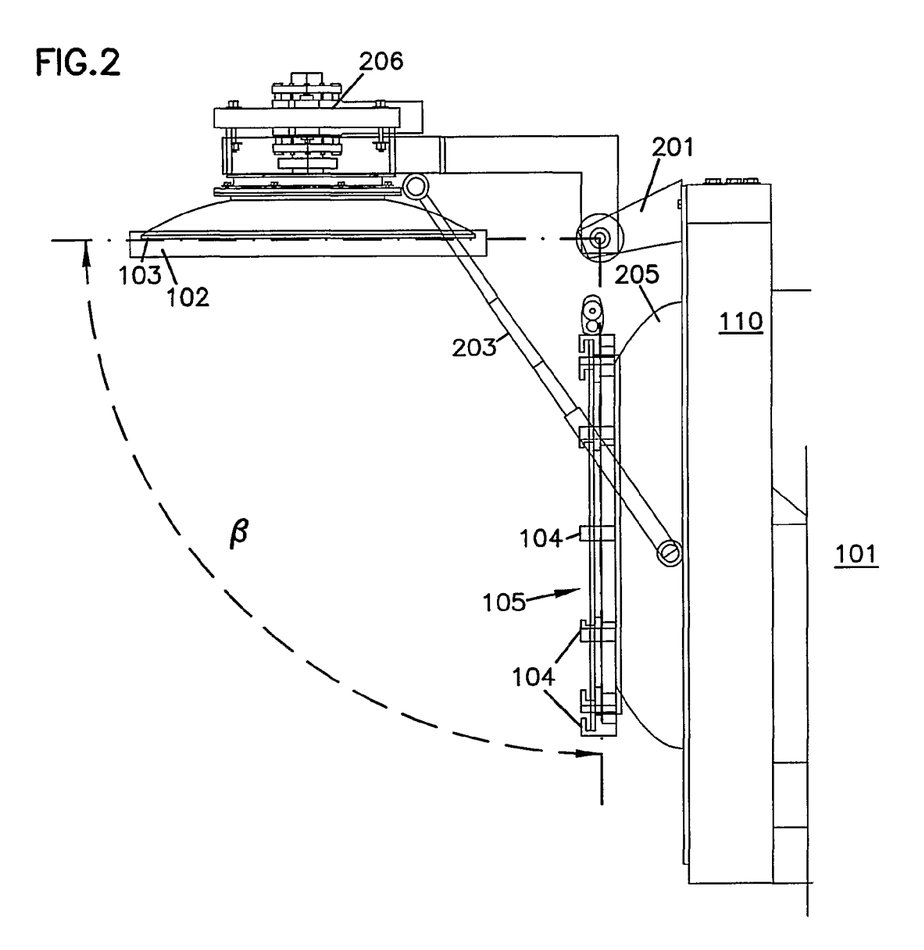
FIG. 2 is a side view of the open door and locking member of the pressure vessel.

FIG. 2 shows a side view of the open door 102 and vessel 101. Door 102 moves through angle β from an open position to a closed position. The door moves on hinge structure 201 to bring ring keeper or locking ring 103 into contact with vessel locking member 104 positioned on locking surface 205. Once closed, door 102 contacts door closure surface 105 and forms a pressure sealed surface. In order to lock the door in place, locking ring 103 expands to contact vessel locking member 104. Vessel 101 rotates in frame and bearing structure 110. When door 102 is closed, it rotates with pressure vessel 101. Door 102 rotates on door rotational bearing 206 to maintain pressure within vessel 101 and to adequately treat solid waste contained inside. Door opening and closing is actuated by member 203 and hydraulic apparatus not shown.

FIG. 3 is an end view showing detail of only the ring keeper or locking ring 103 in its open and closed diameter positions cooperating with vessel locking members 104. In FIG. 3, ring keeper or locking ring 103 is shown in its open position. Ring keeper or locking ring 103 in the open position permits door 102 to swing from the open position to the closed position. Once closed, the ring keeper or locking ring 103 is expanded radially to position 103a, contacting vessel locking member 104 to hold ring keeper or locking ring 103 in place at position 103a, holding door 102 closed against door closure surface 105. Ring keeper or locking ring 103 is expanded from its initial position to position 103a using actuator means 303. Actuator means is positioned so that split ring ends 301 and 302 in the open position. The actuator 303 can be energized to urge split ring ends 301 and 302 apart to the closed and locked positions 301a of the split ring end 301 and closed and locked position 302a of split ring end 302. The direction of radial movement is shown in FIG. 3.

Figure 4:
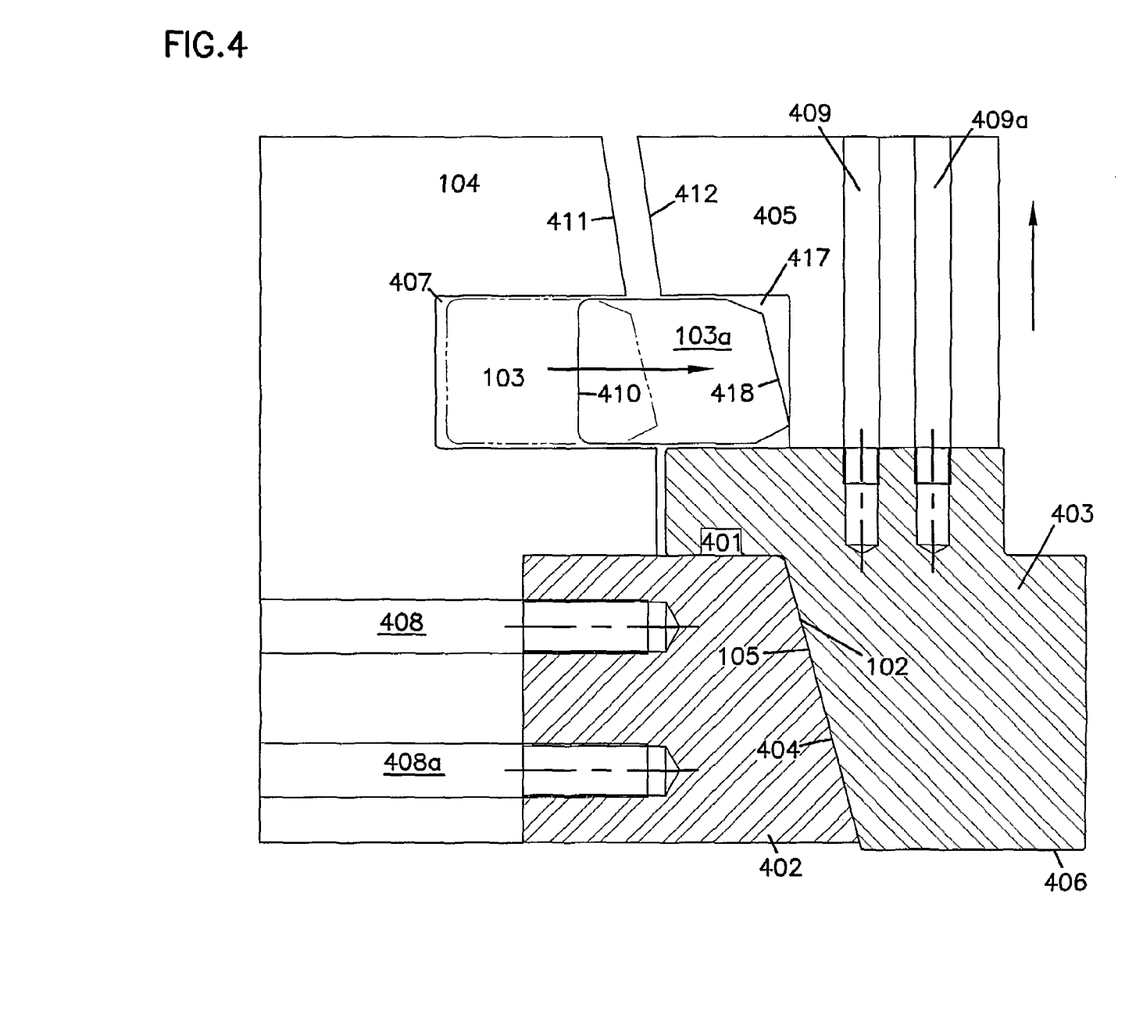
FIG. 4 is a cross section of FIG. 3 at line 4-4 showing detail of the door lock assembly, the circular member in its open and closed and locked positions with respect to the door and vessel.

FIG. 4 is a cross section of FIG. 3 at line 4-4. In FIG. 3, door 102 is shown in a closed position. Door 102 is shown in contact with door closure surface 105 forming a pressure tight seal. Aperture 401 is shown in door 102 providing a location for a gasket or seal structure further providing pressure integrity. Door lock frame 405 is shown attached to the door ring 403 using bolts 409 and 409a. Vessel locking member 104 is shown attached to vessel neck ring 402 using bolts 408 and 408a. Vessel locking member 104 has aperture 407 for ring keeper or locking ring 103, permitting its motion from an open position to a locked position. Similarly, door lock frame 405 includes aperture 417 cooperating with aperture 407 to permit movement of ring keeper or locking ring 103 to a closed and locked position 103a. In the open position, the locking ring generally resides in aperture 407. In the closed and locked position 103a, the locking ring resides in both aperture 407 and aperture 417. Locking ring 103 is shown in FIG. 4 having a polygonal cross section. The ring keeper or locking ring 103 has a leading edge 418 and a following edge 410. The following edge 410 tends to be perpendicular to the direction of movement of the ring keeper or locking ring 103 while the leading edge 418 appears to be slanted to an angle that departs from perpendicular to the direction of the movement. The angle of leading edge 418 is similar to the angle of edge 411 of vessel locking member 104 and edge 412 of the door lock frame 405, permitting door 102 to swing freely of the locking member when it is in an open position.

The above specification, examples and data provide a complete description of the manufacture and use of the composition of the invention. Since many embodiments of the invention can be made without departing from the spirit and scope of the invention, the invention resides in the claims hereinafter appended.

I claim:

1. A rotatable pressure vessel assembly having a closure, the vessel comprising an enclosed volume of about 30 to about 90 m$^3$ capable of maintaining an internal pressure of about 10 to about 4200 kPa, a temperature of about 20 to about 200° C. and a relative humidity up to about 100%, and the vessel defining a closure surface that cooperates with a closure to seal the vessel;

the closure comprising a circular door, and a split ring locking assembly, wherein the split ring locking assembly comprises a split ring and a means to change the diameter of the split ring, the split ring having a first diameter comprising a locked position and a second diameter comprising an unlocked position, where the first diameter is different than the second diameter;

a support frame having a bearing assembly configured to rotatable support the vessel; and a hinge structure coupled to the support frame and the closure, wherein the hinge structure is configured to bring the closure into contact with the closure surface to seal the vessel.

2. The vessel of claim 1 wherein the split ring has an open diameter held entirely within the circular door.

3. The vessel of claim 1 wherein the split ring, when open, is held entirely within the vessel aperture.

4. The vessel of claim 2 wherein the closing diameter of the split ring is from about 1.8 to about 2.2 meters, while the open diameter is about 2 to about 2.5 meters.

5. The vessel of claim 3 wherein the closing diameter of the split ring is from about 2 to about 2.5 meters, while the open diameter is about 1.8 to about 2.2 meters.

* * * * *